(12) United States Patent
Zhang et al.

(10) Patent No.: US 10,187,747 B1
(45) Date of Patent: Jan. 22, 2019

(54) LOCATION SEARCH USING DYNAMIC REGIONS GENERATED BASED ON SERVICE DATA

(71) Applicant: Uber Technologies, Inc., San Francisco, CA (US)

(72) Inventors: Yu Zhang, San Francisco, CA (US); Ye Fan, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/018,735

(22) Filed: Jun. 26, 2018

(51) Int. Cl.
*H04W 24/00* (2009.01)
*H04W 4/021* (2018.01)

(52) U.S. Cl.
CPC ................... *H04W 4/022* (2013.01)

(58) Field of Classification Search
CPC ........ H04W 4/022; H04W 4/02; H04W 4/029
USPC .... 455/456.3, 456.1, 404.2, 414.1, 418, 457
See application file for complete search history.

(56) References Cited

U.S. PATENT DOCUMENTS

| | | | |
|---|---|---|---|
| 2011/0159862 A1* | 6/2011 | Jackson | G01S 5/02 455/418 |
| 2013/0130680 A1* | 5/2013 | Peterson | H04W 24/00 455/434 |
| 2015/0282115 A1* | 10/2015 | Pitt | H04W 64/006 455/456.1 |

\* cited by examiner

*Primary Examiner* — Nghi H Ly
(74) *Attorney, Agent, or Firm* — Schwegman Lundberg & Woessner, P.A.

(57) ABSTRACT

Systems and methods for improving a location search process are provided. A networked system accesses trip data associated with the POI. The networked system receives an indication of a search being performed at a user device and detects a location of the user device. The networked system accesses an index in a data storage. From the index, the networked system determines a region identifier that corresponds to the location of the user device, the region identifier identifying a dynamically generated region in which to perform the search. Based on a search term, the networked system performs the search in the dynamically generated region corresponding to the region identifier. The networked system then causes presentation of a result of the search on the user device.

20 Claims, 7 Drawing Sheets

LOCATION SEARCH USING DYNAMIC REGIONS GENERATED BASED ON SERVICE DATA

TECHNICAL FIELD

The subject matter disclosed herein generally relates to machines configured to the technical field of special-purpose machines for performing searches, and to the technologies by which such special-purpose machines become improved compared to other machines that perform searches. Specifically, the present disclosure addresses systems and methods to perform location searches using dynamically regions generated based on analysis of service data.

BACKGROUND

Conventionally, search systems visually make the whole Earth a square and place grids on the square. When a search is performed, conventional search systems determine where a searcher is on a grid. Then, the conventional search systems search for points where addresses or a point of interest (POI) falls into the same or neighboring grids. To expand the search to a larger radius or area would be computationally expensive.

BRIEF DESCRIPTION OF THE DRAWINGS

Some embodiments are illustrated by way of example and not limitation in the figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for improving a search process by using regions dynamically generated based on service data. In example embodiments, the service data comprises trip data. Accordingly, a technical solution involves systems and methods that periodically analyze trip data (also referred to as "trip logs") in order to dynamically generate a region to which users in one locale typically travel. In example embodiments, a networked system obtains and stores trip data. The trip data comprises information pertaining to a service provided between a pick-up location to a drop-off location including, for example, time when a request for service was made, where a request for service was made, a device in use, time when a vehicle arrived, and time when a user or item got dropped off. The service may comprise a transportation service or a delivery service (e.g., food or goods delivery).

Using the trip data, the networked system generates, using a clustering algorithm, location clusters based on time, pick-up locations, and drop-off locations to identify location clusters (e.g., arbitrarily shaped areas, all or portions of one or more cities, counties, or zip codes) where users typically go from a particular locale (e.g., a particular city, a particular county, a particular zip code, a particular neighborhood) in accordance with some example embodiments. The location clusters are then grouped into a region to be searched when a search location (e.g., a pick-up location) is within the particular locale.

In alternative embodiments, the networked system generates the region based on previously classified areas. The previously classified areas may be previously classified based on a zip code, a congressional district, a neighborhood, city, county, state, or any other existing classification scheme for an area. For a particular locale, the networked system determines a number of trips from the particular locale to each of a plurality of previously classified areas. The networked system then ranks the plurality of previously classified areas based on the number of trips and selects a top number of previously classified areas based on the ranking. The top number of previously classified areas are then grouped to form the dynamically generated region for the particular locale.

The region may be any size or shape and can contain areas or clusters that are not adjacent to each other. Once the region is generated, stored data such as a point of interest (POI) or an address in the particular locale is indexed with a region identifier that corresponds to the generated region.

During runtime, the networked system detects a location (e.g., an address or POI) of a user device, or near the user device, that is performing the search. Using the detected location, the networked system accesses a data store that stores the indexed data. A region identifier corresponding to the location is obtained from the index and used to identify a corresponding region in which to conduct the search. The networked system then performs the search in the region identified by the region identifier based on a search term (e.g., all or part of an address or POI name; selection of a category) received from the user device, and presents results. In some embodiments, if no results are found within the region, the search may be expanded to a larger radius around the location of the user device or expanded globally.

For example, if the locale is downtown San Francisco, the region for San Francisco may comprise areas located within Northern California including San Francisco, San Jose, Palo Alto, Oakland, and Napa. Each locale has a region that may include different areas. Thus, for example, if the locale is San Jose, the region for San Jose may include San Jose, Gilroy, Fremont, San Francisco, and Morgan Hill. As a result, in these examples, a user in downtown San Francisco performing a search will have their search term (e.g., a portion of, or complete, POI or address) searched in areas including San Francisco, San Jose, Palo Alto, Oakland, and Napa, while a user in San Jose will have their search term searched in areas including San Jose, Gilroy, Fremont, San Francisco, and Morgan Hill. While cities are used as the area or cluster in these examples, the area or cluster can comprise any geographic boundary such as a zip code, congressional district, neighborhood, or county, or be any arbitrary boundary of any size or shape (e.g., where a threshold number of trips originated or ended) as determined by the clustering algorithm. The granularity of the area or cluster used may be dependent on computing resources that are available or be set/selected by an operator of the networked system.

Thus, example methods (e.g., algorithms) and example systems (e.g., special-purpose machines) are configured to improve a search process using dynamically generated regions. The regions are dynamic in that the regions are periodically updated using mostly recently obtained trip data. In particular, some embodiments provide mechanisms and logic that use clustering algorithms, such as K-means clustering, applied to trip data associated with a locale in order to generate a region comprising a plurality of clusters to which users are most likely to travel from that locale. Other embodiments determine most popular previously classified areas traveled to from the locale to generate the region. The region provides a smaller search area than searching globally for a POI or address. Therefore, one or more of the methodologies described herein facilitate solving the technical problem of providing an accurate search result that is not computationally expensive. As a result, resources used by one or more machines, databases, or devices (e.g., within the environment) may be reduced. Examples of such computing resources include processor cycles, network traffic, memory usage, data storage capacity, power consumption, network bandwidth, and cooling capacity. Additionally, by searching a specific region instead of globally, search results are obtained and presented faster.

Figure 1:
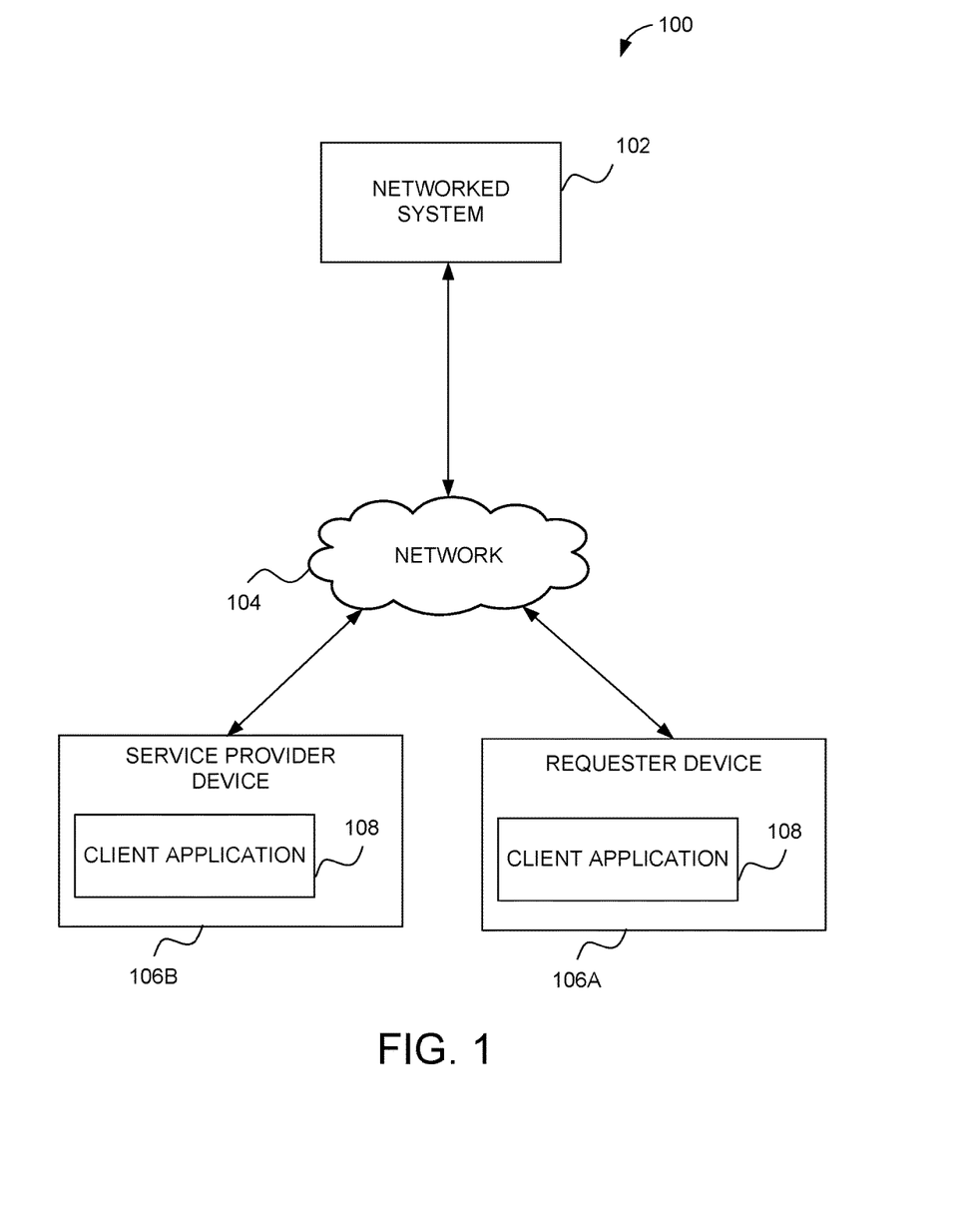
FIG. 1 is a diagram illustrating a network environment suitable for performing a location search using dynamically generated regions, according to some example embodiments.

FIG. 1 is a diagram illustrating a network environment 100 suitable for improving a search process by performing a location search using dynamically generated regions, according to some example embodiments. The network environment 100 includes a networked system 102 communicatively coupled via a network 104 to a requester device 106a and a service provider device 106b (collectively referred to as "user device 106"). In example embodiments, the networked system 102 comprises components that obtain, store, and analyze trip data in order to dynamically generate regions to be searched, generate an index based on the regions, and perform a search for a location using the index. The components of the networked system 102 is described in more detail in connection with FIG. 2 and may be implemented in a computer system, as described below with respect to FIG. 6.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities. The user devices 206 interact with the networked system 102 through a client application 108 stored thereon. The client application 108 of the user devices 106 allow for exchange of information with the networked system 102 via user interfaces. The client application 108 running on the user devices 106 may also determine location information of the user devices 106 (e.g., latitude and longitude for a pick-up or a drop-off location of a trip), and provide the location information to the networked system 102 for storage as part of the trip data.

In example embodiments, a user operates the requester device 106a that executes the client application 108 to communicate with the networked system 102 to make a request for transport or delivery service (referred to collectively as a "trip"). In some embodiments, the client application 108 determines or allows the user to specify a pick-up location (e.g., of the user or an item to be delivered) and to specify a drop-off location for the trip. For example, the pick-up location or the drop-off location may be an address or name of a POI inputted by the user on a user interface provided via the client application 108, or the pick-up location or the drop-off location corresponds to a current location of the requester device 106a as automatically determined by a location determination module (not shown) in the requester device 106a (e.g., a global positioning system (GPS) component). In some embodiments, the networked system 102 recommends the pick-up location or drop-off location based on historical trip data associated with the user of the requester device 106a. In example embodiments, the client application 108 provides a current location (e.g., coordinates such as latitude and longitude) of the requester device 106a to the networked system 102. The client application 108 also presents information, from the networked system 102 via user interfaces, to the user of the requester device 106a.

A second user operates the service provider device 106b to execute the client application 108 that communicates with the networked system 102 to exchange information associated with providing transportation or delivery service to the user of the requester device 106a. The client application 108 presents information via user interfaces to the user of the service provider device 106b, such as invitations to provide transportation or delivery service and navigation instructions. The client application 108 also provides a current location (e.g., coordinates such as latitude and longitude) of the service provider device 106b to the networked system 102, whereby the current location may comprise a pick-up location or a drop-off location of a POI (or locations in between on a route between the pick-up location and the drop-off location). Depending on implementation, the current location may be a location corresponding to the current location of the service provider device 106b as determined automatically by a location determination module (not shown) in the service provider device 106b. In example embodiments, the pick-up location or the drop-off location corresponds to an address for a POI and are associated with coordinates (e.g., latitude and longitude) based from either a location of the requester device 106a or the service provider device 106b when a trip starts and/or when the trip ends.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. While only a single networked system 102 is shown, alternative embodiments may contemplate having more than one networked systems 102 to perform server operations discussed herein for the networked system 102.

Figure 2:
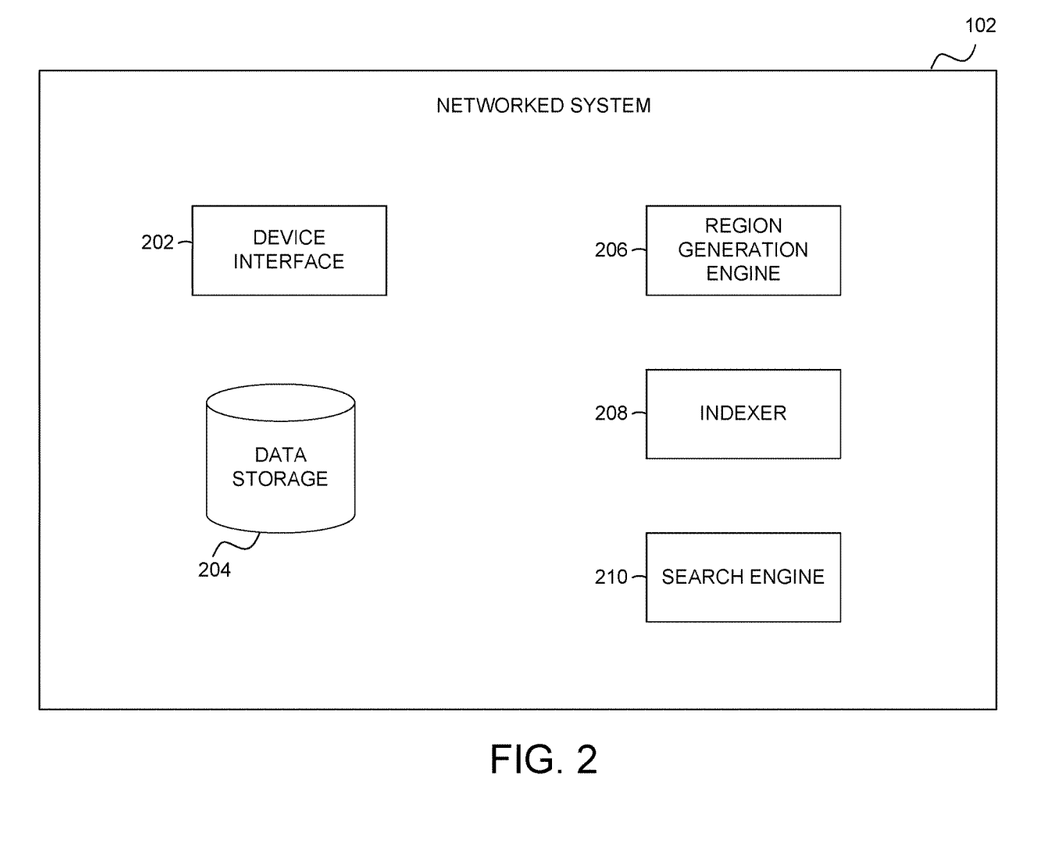
FIG. 2 is a block diagram illustrating components of a networked system, according to some example embodiments.

FIG. 2 is a block diagram illustrating components of the networked system 102, according to some example embodiments. In various embodiments, the networked system 102 obtains and stores trip data, analyzes the trip data to dynamically generate regions to be searched, generates and updates an index based on the generated regions, and performs a search for a location using the index. To enable these operations, the networked system 102 comprises a device interface 202, a data storage 204, a region generation engine 206, an indexer 208, and a search engine 210 all configured to communicate with each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the user devices 106 and cause presentation of one or more user interfaces on the user devices 106. In example embodiments, the device interface 200 generates and transmits instructions (or the user interfaces themselves) to the user devices 106 to cause the user interfaces to be displayed on the user devices 106. The user interfaces can be used to request transport or delivery service from the requester device 106a, display invitations to provide the service to the service provide device 106b, and present navigation instructions to the service provide device 106b. The device interface 200 also receives information such as locations (e.g., latitude and longitude) from the user devices 106, touch inputs, and other trip information from the user devices 106 (e.g., route taken, trip ratings). At least some of the information received from the user devices 106 are stored to the data storage 204 as the trip data.

The data storage 204 is configured to store various data used by the networked system 102 to perform dynamic region generation, indexing, and searching. For example, the data storage 204 stores the trip data which comprises information pertaining to trips from a pick-up location to a drop-off location including names of POI, addresses, and/or coordinates (e.g., longitude and latitude). In example embodiments, the data storage 204 also stores the index.

The region generation engine 206 generates a region to be searched for each locale. The region comprises a small area (as opposed to globally) to be search that is most likely to contain a result for a location search based on historical data (e.g., trip data of users traveling from the same locale). In some embodiments, the region generation engine 206 applies a clustering algorithm to determine where users travel to the most from each locale. In one embodiment, the clustering algorithm comprises the K-means clustering algorithm. In another embodiment, the clustering algorithm comprises the DB SCAN clustering algorithm. However, any clustering algorithm may be used by the region generation engine 206.

Accordingly, the region generation engine 206 accesses the trip data associated for a particular locale that includes a plurality of POI or addresses. For example, the trip data may indicate that the POI was a drop-off location of a trip or a pick-up location of the trip. The trip data for a trip involving the POI (as either a pick-up or drop-off location) comprises a set of data including latitude and longitude (also referred to herein as "coordinates") and one or more timestamps for the trip (e.g., time when the trip began, time when the trip is completed, time a request for service was received). Given this data, the region generation engine 206 applies a clustering algorithm that takes spatial two-dimensional data (e.g., the coordinates) to generate spatial clusters. In one embodiment, the clustering algorithm is a K means clustering algorithm where K can be any number (e.g., the number indicates the number of clusters to generate). In some embodiments, the region generation engine 206 uses coordinates of the drop-off location when the drop-off location is the POI in performing the clustering. Typically, the coordinates of a drop-off location correspond closely to a final destination (e.g., address of the POI) that a user wants to be dropped off at or an item delivered to. However, coordinates of a pick-up location associated with a POI may be used in some embodiments. For example, in a delivery service scenario, the pick-up locations associated with POIs are used in generating the regions. Further, in other embodiments, the clustering module 212 uses coordinates for cases where the POI is both the drop-off location or pick-up location.

A result of the clustering algorithm comprises a plurality of location clusters, based on time of day, pick-up locations, and drop-off locations, that are areas (e.g., all or portions of one or more cities, counties, zip codes, or congressional district; arbitrarily shaped areas) where users typically go from the particular locale (e.g., a particular city, a particular county, a particular zip code, a particular neighborhood, particular arbitrarily shaped area). The plurality of location clusters is grouped together to form the dynamically generated region for the particular locale. The region may be any size or shape and can contain location clusters that are not adjacent to each other.

In some embodiments, the region generation engine 206 generates the region based on ranking of previously classified areas. The previously classified areas may be previously classified based on a zip code, a congressional district, a neighborhood, city, county, state, or any other existing classification scheme for an area. For a particular locale, the region generation engine 206 determines a number of trips from (and/or to in some embodiments) the particular locale to each of a plurality of previously classified areas. The networked system then ranks the plurality of previously classified areas based on the number of trips and selects a top number of previously classified areas based on the ranking. The top number of previously classified areas are then grouped to form the dynamically generated region for the particular locale.

In some embodiments, the region generation engine 206 may add a popular area to most or all regions regardless of a predetermined threshold or ranking of the area relative to other areas or clusters. For example, the popular area may comprise an airport (e.g., San Francisco International Airport) to which users in every locale (e.g., within a predetermined distance) travel. In this example, the airport is included in the generated region for all these locales.

The region generation engine 206 periodically updates the regions for each locale. For example, the region generation engine 206 may update the regions each month based on a particular number of months of trip data (e.g., last 3 months of trip data). By periodically updating the regions, changes due to, for example, trends, seasonality, or just a general shift in travel destinations are considered. As a result, the networked system 102 maintains dynamically generated regions that consider current travel habits of users of the networked system 102 resulting in an optimized location search.

The indexer 208 generates and updates an index that includes region identifiers corresponding to the dynamically generated regions. Specifically, the indexer 208 indexes data in the data storage 204 with the region identifier to indicate the region to be search. Accordingly, stored data, such as a point of interest (POI) or an address in the particular locale, is indexed by appending a region identifier that corresponds to the generated region for the particular locale to the stored data for the POI or address in the particular locale. By indexing the POI or address with the region identifier, when a search is performed from or near the POI or address, the region to be search (or to be searched first) is identified from the corresponding appended region identifier.

The search engine 210 performs the location search at the networked system 102. In example embodiments, the search engine 210 detects when a user at the requester device 106a activates the client application on the requester device 106a. In some embodiments, the search engine 210 receives location information from the requester device 106a (e.g., coordinates from a GPS device). Using the location information, the search engine 210 identifies a device POI or address (or a nearby POI or address) where the requester device 106a is located. Using the device POI or address, the search engine 210 accesses the index generated and maintained by the indexer 208, and looks up the device POI or address in the index. Data is accessed from the index for the device POI or address which includes the region identifier.

In some embodiments, once entry of the search term is completed by the user, the search engine 210 uses the region identifier to identify the area or clusters in which to search for the search term. In one embodiments, the search engine 210 appends the region identifier to the search terms. By appending the region identifier, the search engine 210 performs the search for the search term in the region (e.g., the top areas or location clusters) corresponding to the region identifier.

In some embodiments, the search engine 210 provides suggestions for a POI or address as the user is entering the POI or address. The suggestion may be based on one or more letters or numbers entered by the user as a search term for a destination to travel or deliver to, or a destination from which to pick-up an item to be delivered to the user. The suggestion may also be provided when the user navigates a category tree (e.g., selects a category or a series of narrowing categories) to find a POI (e.g., selects "restaurants" then "Italian" to obtain a list of Italian restaurants). In these embodiments, the search engine 210 makes an educated guess, based on historical data (e.g., past searches by the user) as to where the user may want to travel to (or a location where an item is to be picked up from or delivered to), and provides suggestions from which the user can select. In some embodiments, the suggestions may be based on the region identifier for the device POI or address where the requester device 106 is located. That is, the search engine 210 performs an analysis of the historical data for POIs or addresses in a region identified from the region identifier that corresponds to a location where the requester device 106 is located to determine the suggestions.

Figure 3:
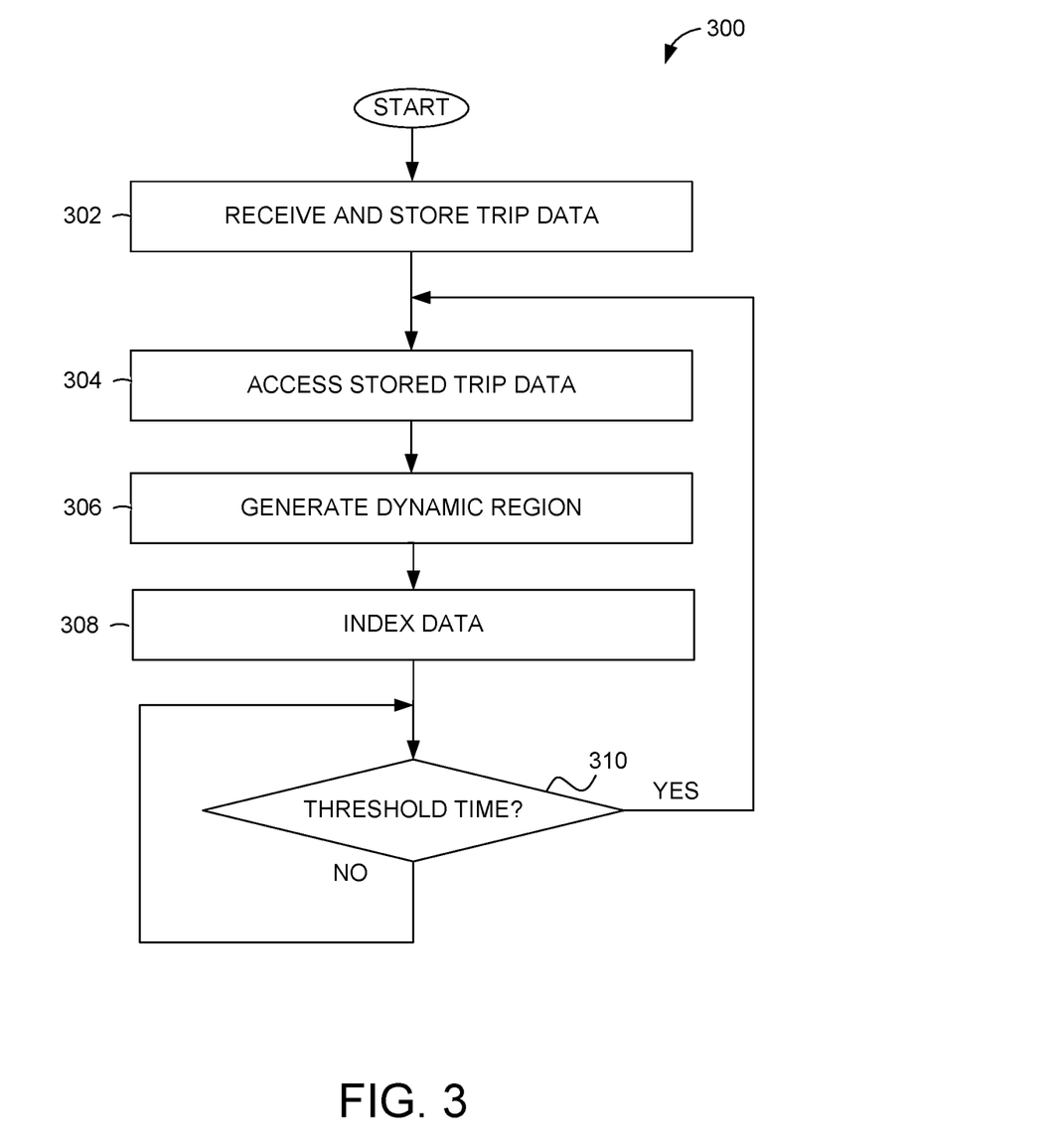
FIG. 3 is a flowchart illustrating operations of a method for generating a region and index based on dynamically generated regions, according to some example embodiments.

FIG. 3 is a flowchart illustrating operations of a method 300 for generating a region and index based on dynamically generated regions, according to some example embodiments. Operations in the method 300 may be performed by the networked system 102, using components described above with respect to FIG. 2. Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

In operation 302, trip data is received and stored as trip logs. In example embodiments, the device interface 202 receives coordinates (e.g., latitude and longitude) from the requester device 106 or service provider devices 108 indicating a potential trip (e.g., in a trip request) as well as during a trip (e.g., when a pick-up occurs and when the trip is completed). The coordinates may correspond to a POI that is a pick-up location, a drop-off location, or a location when a service is requested. Additionally, other trip data from the trip (e.g., time of pick-up, time of drop-off, duration, cost, length of trip) are received. The received trip data for the trip is stored to the data storage 204 as the trip data or a trip log. The trip data may be received and stored as trip logs at any time.

In operation 304, the region generation engine 206 periodically accesses the stored trip data. In particular, the region generation engine 206 accesses the trip data associated with each locale. The trip data may be associated with a locale based on a pick-up location or a drop-off location being within the locale.

In operation 306, the region generation engine 206 generates a dynamic region for each locale. The generation of the dynamic region is discussed in further details in connection with FIG. 4A and FIG. 4B below.

In operation 308, the indexer 208 indexes the data in the data storage 204 using the dynamically generated regions. The indexer 208 indexes the data by appending a region identifier that corresponds to the generated region for a particular locale to stored data for each POI or address located within the particular locale. By indexing the POI or address with the region identifier, the region to be search (or to be searched first in priority) is identified from the appended region identifier.

In operation 310, a determination is made (e.g., by the region generation engine 206) if a threshold time is reached. If the threshold time is reached, then the method 300 returns to operation 304, and the regions are dynamically generated (or updated). In an alternative embodiment, instead of triggering the updating (e.g., dynamically generating) of the regions based on a threshold time, the networked system 102 can trigger the updating based on an event. For example, if a predetermined amount of new trip data is stored, the networked system 202 triggers an update to the regions. Further still, the update can be triggered manually by an operator of the networked system 102.

Figure 4A:
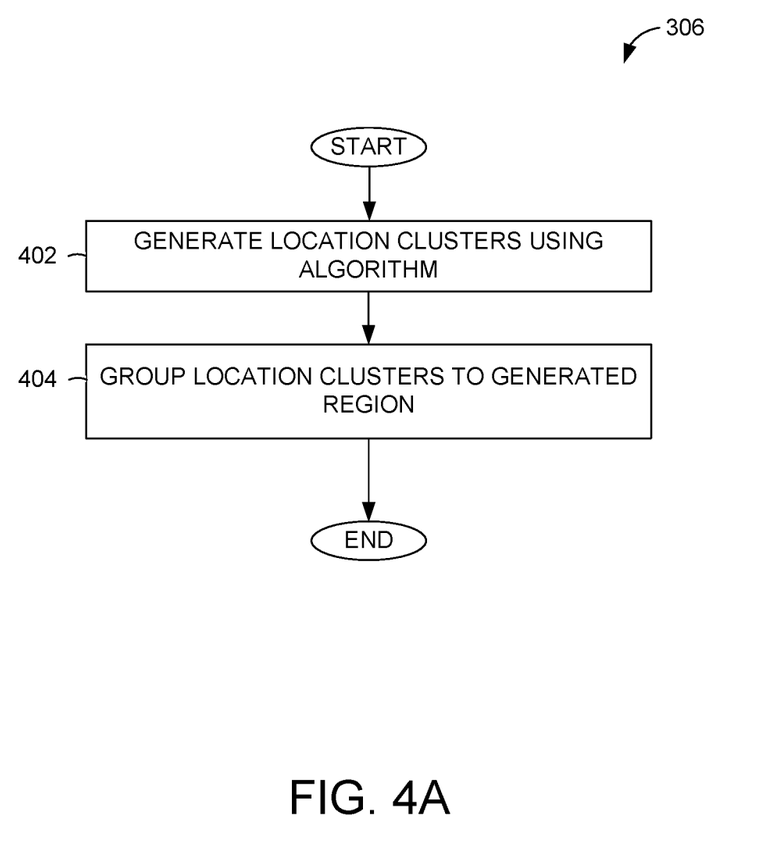
FIG. 4A is a flowchart illustrating operations of a method for dynamically generating the region.

FIG. 4A is a flowchart illustrating operations of a method (e.g., operation 306) for dynamically generating the region, according to some example embodiments. Operations in the method may be performed by the networked system 102, using components described above with respect to FIG. 2. Accordingly, the method is described by way of example with reference to the networked system 102. However, it shall be appreciated that at least some of the operations of the method may be deployed on various other hardware configurations or be performed by similar components residing elsewhere in the network environment 100. Therefore, the method is not intended to be limited to the networked system 102.

In operation 402, the region generation engine 206 generates location clusters for a locale. In example embodiments, the region generation engine 206 applies a clustering algorithm that takes spatial two-dimensional data (e.g., the coordinates of the pick-up location or drop-off location) of the trip data to generate spatial clusters. In one embodiment, the clustering algorithm is a K means clustering algorithm where K indicates the number of clusters to generate. A result of the clustering algorithm comprises a plurality of location clusters. The clustering algorithm may also take time of day into consideration. For example, the clustering algorithm can create a set of location clusters for a morning timeframe and another set of location clusters for the same locale for an afternoon timeframe and yet a further set of location clusters for an evening timeframe. The location clusters can comprise, for example, all or a portion of a city, county, zip code, or neighborhood, or an arbitrarily shaped area that users typically travel from a particular locale (e.g., a particular city, a particular county, a particular zip code, a particular neighborhood, particular arbitrarily shaped area), have items picked-up from, or have items delivered to.

In operation 404, the location clusters are grouped together, by the region generation engine 206, to form the dynamic region. The region may be any size or shape and can contain location clusters that are not adjacent to each other.

Figure 4B:
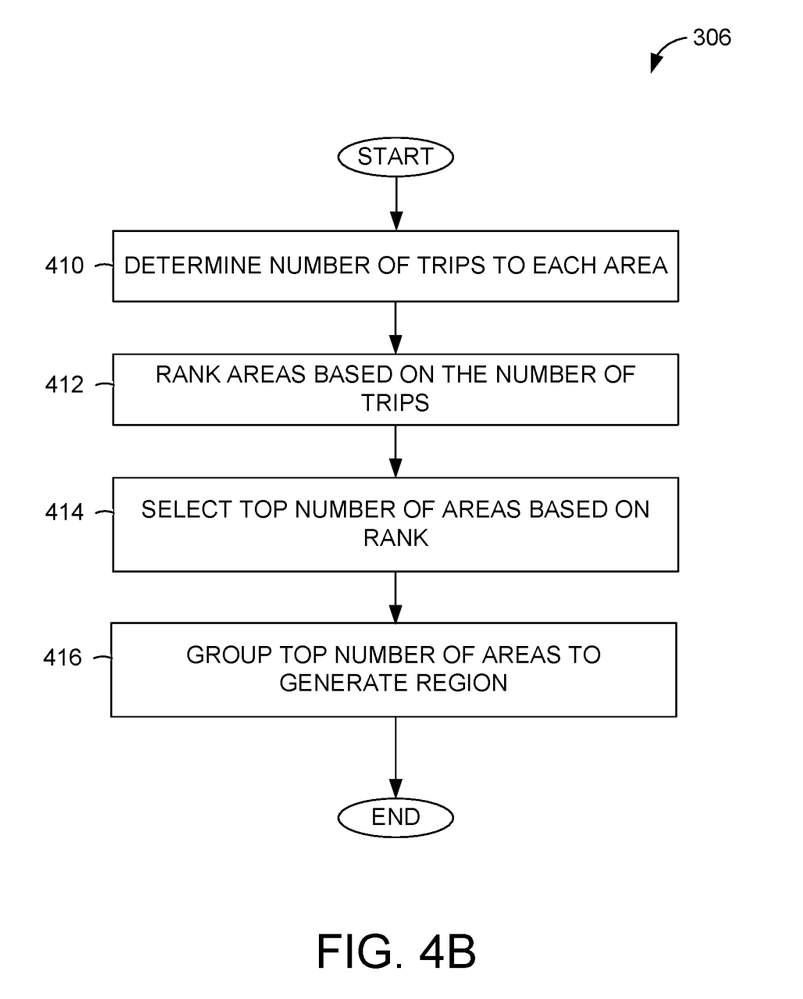
FIG. 4B is a flowchart illustrating operations of an alternative method for dynamically generating the region.

FIG. 4B is a flowchart illustrating operations of an alternative method (e.g., operation 306) for dynamically generating the region, according to some example embodiments. Operations in the method may be performed by the networked system 102, using components described above with respect to FIG. 2. Accordingly, the method is described by way of example with reference to the networked system 102. However, it shall be appreciated that at least some of the operations of the method may be deployed on various other hardware configurations or be performed by similar components residing elsewhere in the network environment 100. Therefore, the method is not intended to be limited to the networked system 102.

In operation 410, the region generation engine 206 analyzes the trip data and determines a number of trips to (and/or from) each area (e.g., each previously classified area) from a particular locale. In example embodiments, the region generation engine 206 maintains a counter for each area.

In operation 412, the region generation engine 206 ranks the areas based on the number of trips to (and/or from) the areas. Accordingly, in example embodiments, the region generation engine 206 analyzes the counters and orders the areas in descending order based on the counter.

In operation 414, the region generation engine 206 selects a top number of areas based on the ranking performed in operation 412. For example, the region generation engine 206 can select the top ten areas for each locale.

In operation 416, the areas are grouped together, by the region generation engine 206, to form the dynamic region. The region may be any size or shape and can contain areas that are not adjacent to each other.

In some embodiments, the region generation engine 206 may include a popular area or location to most or all regions within a threshold distance regardless of the predetermined threshold or ranking of the area (e.g., area the location is within) relative to other areas or clusters. For example, the popular area may be an airport (e.g., San Francisco International Airport) to which users in every locale (e.g., within a predetermined distance of the airport) travel. In this example, the airport is included in the generated region for all these locales regardless of whether the cluster the airport is located within is included in the region.

Figure 5:
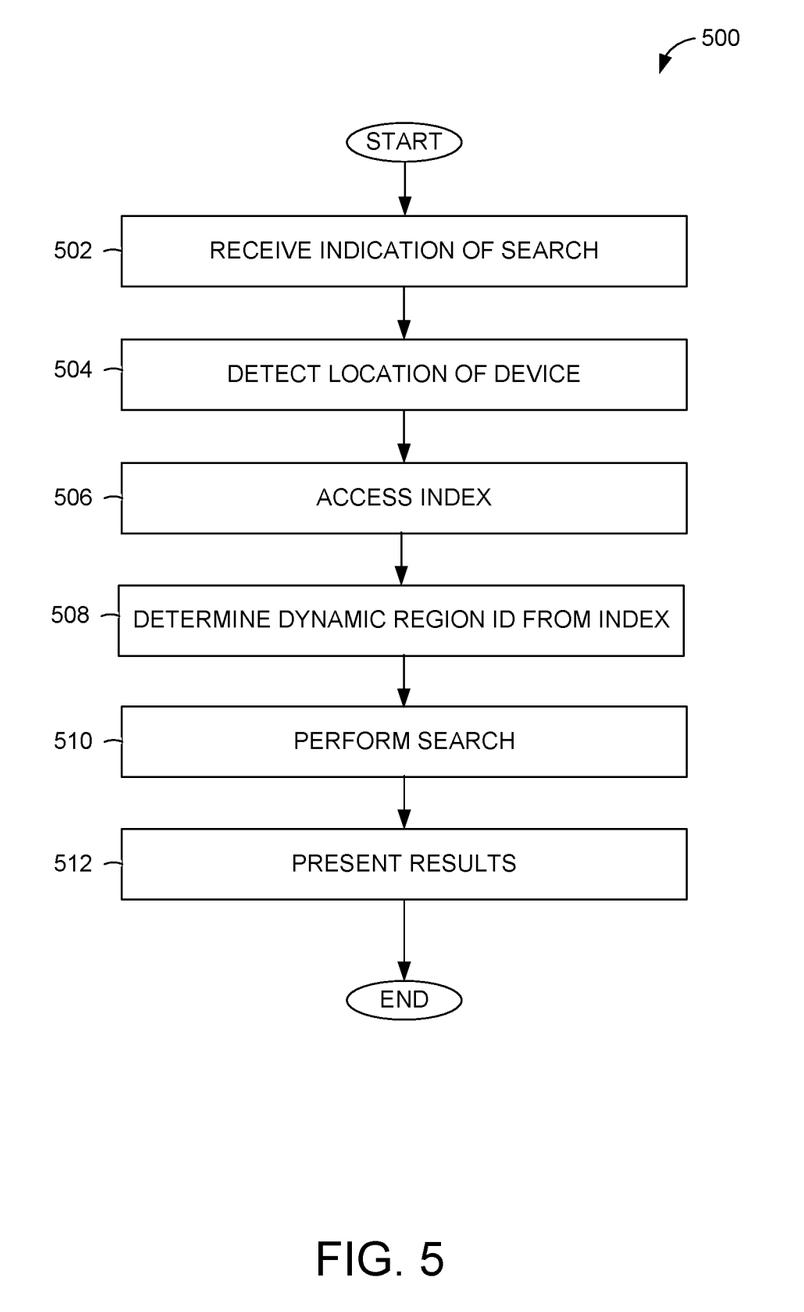
FIG. 5 is a flowchart illustrating operations of a method for performing a location search using the dynamically generated regions, according to some example embodiments.

FIG. 5 is a flowchart illustrating operations of a method 500 for performing a location search using the dynamically generated regions, according to some example embodiments. Operations in the method 500 may be performed by the networked system 102, using components described above with respect to FIG. 2. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102.

In operation 502, the search engine 210 receives an indication of a search. In some embodiments, the search engine 210 detects when a user at the requester device 106a activates the client application on the requester device 106a. The search engine 210 may also detect the user selecting a category or beginning to type a search term.

In operation 504, the search engine 210 detects a location of the requester device 106a. In example embodiments, the search engine 210 receives location information from the requester device 106a (e.g., coordinates from a GPS device). Using the location information, the search engine 210 identifies the device POI or address (or a nearby POI or address) where the requester device 106a is located.

In operation 506, the search engine 210 accesses the index, using the device POI or address identified in operation 504. In example embodiments, the search engine 210 looks up the device POI or address in the index and accesses the data for the device POI or address.

In operation 508, the search engine 210 determines a dynamic region identifier from the index. Accordingly, the search engine 210 analyzes the data accessed in operation 506 and identifies the dynamic region identifier for the device POI or address.

In operation 510, the search engine 210 performs a search using the search term in the region that corresponds to the region identifier. In some embodiments, the search engine 210 appends the region identifier (or the region corresponding to the region identifier) to the search term prior to performing the search. As a result, the search engine 210 narrows down on areas or clusters in which to perform the search.

In some embodiments, the search engine 210 provides suggestions for the POI or address as the user is entering one or more letters or numbers or when the user navigates a category tree (e.g., selects a category and one or more sub-categories) to find the POI. In these embodiments, the search engine 210 makes an educated guess, based on historical data (e.g., past searches by the user) and the region identifier as to where the user may want to travel to (or a location where an item is to be picked up from or delivered to). The result is then provided as a list of suggestions from which the user can select to complete the search term entry and trigger the search.

In operation 514, the networked system 102 presents the results. In example embodiments, the device interface 200 generates and transmits instructions (or transmits the user interface) to the user devices 106 to cause the user interface having the search results to be displayed on the user devices 106.

Figure 6:
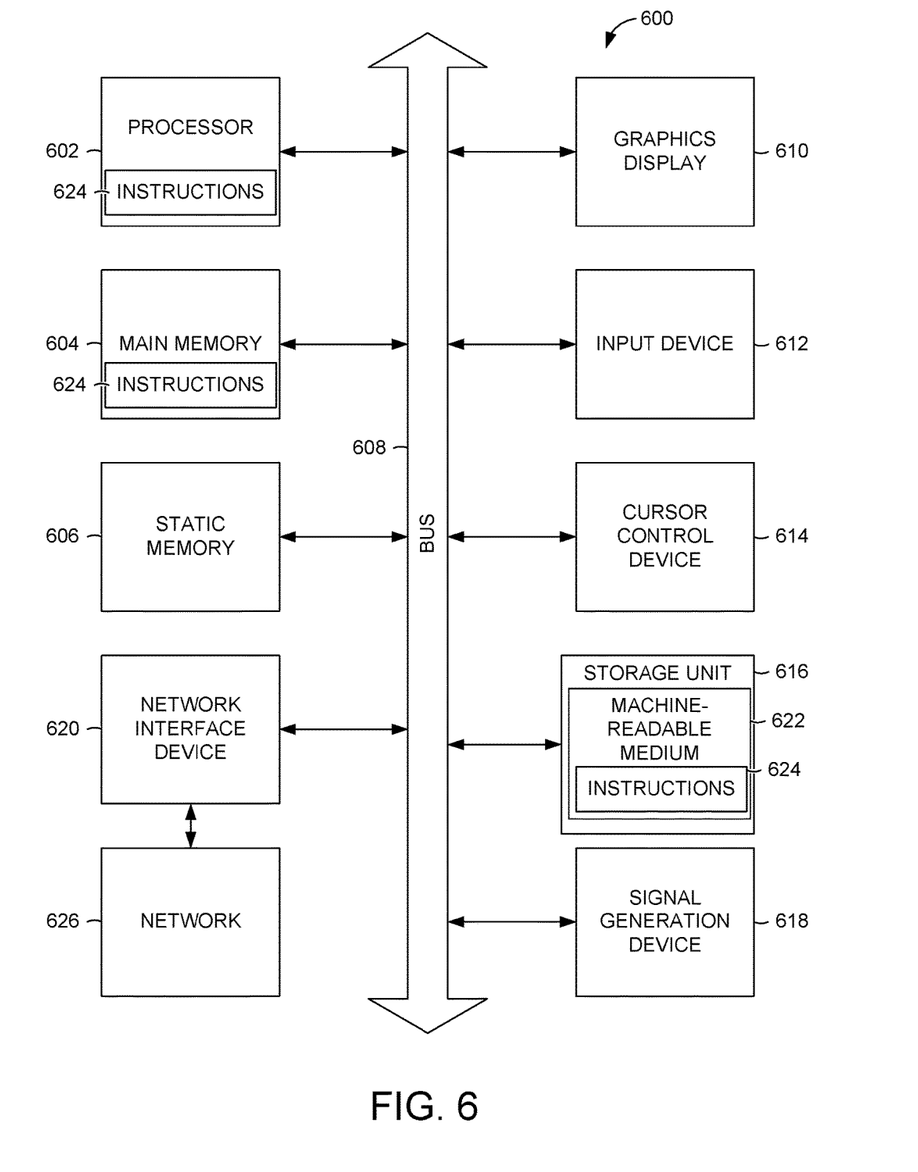
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIGS. 3-5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-readable medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and/or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a system for improving a location search process. The system includes one or more processors and a memory storing instructions that, when executed by the one or more hardware processors, causes the one or more hardware processors to perform operations comprising receiving an indication of a search being performed at a user device; detecting a location of the user device; accessing an index in a data storage; determining, from the index, a region identifier that corresponds to the location of the user device, the region identifier identifying a dynamically generated region in which to perform the search; based on a search term, performing the search in the dynamically generated region corresponding to the region identifier; and causing presentation of a result of the search on the user device.

In example 2, the subject matter of example 1 can optionally include wherein the operations further comprise generating the dynamically generated region, the generating comprising: accessing trip data; for a particular locale, generating a plurality of location clusters, each location cluster representing an area to which a threshold number of users traveled from the particular locale; and grouping the plurality of location clusters to form the dynamically generated region for the particular locale.

In example 3, the subject matter of examples 1-2 can optionally include wherein the generating the cluster comprises using the K-means clustering algorithm.

In example 4, the subject matter of examples 1-3 can optionally include wherein the generating the cluster comprise using the density-based spatial clustering of applications with noise (DBSCAN) algorithm.

In example 5, the subject matter of examples 1-4 can optionally include wherein the operations further comprise generating the dynamically generated region, the generating comprising accessing trip data; for a particular locale, determining a number of trips from the particular locale to each of a plurality of previously classified areas; ranking the plurality of previously classified areas based on the number of trips from the particular locale; selecting a top number of previously classified areas based on the ranking; and grouping the top number of previously classified areas to form the dynamically generated region for the particular locale.

In example 6, the subject matter of examples 1-5 can optionally include wherein the plurality of previously classified areas is classified based on a zip code, congressional district, neighborhood, city, or county.

In example 7, the subject matter of examples 1-6 can optionally include wherein the operations further comprise generating the index, the generating the index comprising indexing each point of interest (POI) or address in the data storage with a region identifier that corresponds to a region for a particular locale that the POI or address is located within.

In example 8, the subject matter of examples 1-7 can optionally include wherein the search term comprises a portion of a name of a point of interest (POI) or a portion of an address; and the causing presentation of the result comprises presenting the result as suggestions for completing the name of the POI or the address.

In example 9, the subject matter of examples 1-8 can optionally include wherein the search term comprises a selection of a category; and the causing presentation of the result comprises presenting the result as suggestions for a point of interest (POI).

Example 10 is a method for improving a location search process. The method comprises receiving an indication of a search being performed at a user device; detecting a location of the user device; accessing an index in a data storage; determining, from the index, a region identifier that corresponds to the location of the user device, the region identifier identifying a dynamically generated region in which to perform the search; based on a search term, performing, by one or more hardware processors, the search in the dynamically generated region corresponding to the region identifier; and causing presentation of a result of the search on the user device.

In example 11, the subject matter of example 10 can optionally include generating the dynamically generated region, the generating comprising accessing trip data; for a particular locale, generating a plurality of location clusters, each location cluster representing an area to which a threshold number of users traveled from the particular locale; and grouping the plurality of location clusters to form the dynamically generated region for the particular locale.

In example 12, the subject matter of examples 10-11 can optionally include wherein the generating the cluster comprises using the K-means clustering algorithm.

In example 13, the subject matter of examples 10-12 can optionally include wherein the generating the cluster comprise using the density-based spatial clustering of applications with noise (DBSCAN) algorithm.

In example 14, the subject matter of examples 10-13 can optionally include generating the dynamically generated region, the generating comprising accessing trip data; for a particular locale, determining a number of trips from the particular locale to each of a plurality of previously classified areas; ranking the plurality of previously classified areas based on the number of trips from the particular locale; selecting a top number of previously classified areas based on the ranking; and grouping the top number of previously classified areas to form the dynamically generated region for the particular locale.

In example 15, the subject matter of examples 10-14 can optionally include wherein the plurality of previously classified areas is classified based on a zip code, congressional district, neighborhood, city, or county.

In example 16, the subject matter of examples 10-15 can optionally include generating the index, the generating the index comprising indexing each point of interest (POI) or address in the data storage with a region identifier that corresponds to a region for a particular locale that the POI or address is located within.

In example 17, the subject matter of examples 10-16 can optionally include wherein the search term comprises a portion of a name of a point of interest (POI) or a portion of an address; and the causing presentation of the result comprises presenting the result as suggestions for completing the name of the POI or the address.

In example 18, the subject matter of examples 10-17 can optionally include wherein the search term comprises a selection of a category; and the causing presentation of the result comprises presenting the result as suggestions for a point of interest (POI)

Example 19 is a machine-storage medium for improving a location search process. The machine-storage medium configures one or more processors to perform operations comprising receiving an indication of a search being performed at a user device; detecting a location of the user device; accessing an index in a data storage; determining, from the index, a region identifier that corresponds to the location of the user device, the region identifier identifying a dynamically generated region in which to perform the search; based on a search term, performing the search in the dynamically generated region corresponding to the region identifier; and causing presentation of a result of the search on the user device.

In example 20, the subject matter of example 19 can optionally include generating the dynamically generated region; and generating the index, the generating the index comprising indexing each point of interest (POI) or address in the data storage with a region identifier that corresponds to a region for a particular locale that the POI or address is located within.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
one or more hardware processors; and
a memory storing instructions that, when executed by the one or more hardware processors, causes the one or more hardware processors to perform operations comprising:
receiving an indication of a search being performed at a user device;
detecting a location of the user device;
accessing an index in a data storage;
determining, from the index, a region identifier that corresponds to the location of the user device, the region identifier identifying a dynamically generated region in which to perform the search;
based on a search term, performing the search in the dynamically generated region corresponding to the region identifier; and
causing presentation of a result of the search on the user device.

2. The system of claim 1, wherein the operations further comprise generating the dynamically generated region, the generating comprising:
accessing trip data;
for a particular locale, generating a plurality of location clusters, each location cluster representing an area to which a threshold number of users traveled from the particular locale; and
grouping the plurality of location clusters to form the dynamically generated region for the particular locale.

3. The system of claim 2, wherein the generating the cluster comprises using the K-means clustering algorithm.

4. The system of claim 2, wherein the generating the cluster comprise using the density-based spatial clustering of applications with noise (DBSCAN) algorithm.

5. The system of claim 1, wherein the operations further comprise generating the dynamically generated region, the generating comprising:
accessing trip data;
for a particular locale, determining a number of trips from the particular locale to each of a plurality of previously classified areas;
ranking the plurality of previously classified areas based on the number of trips from the particular locale;
selecting a top number of previously classified areas based on the ranking; and
grouping the top number of previously classified areas to form the dynamically generated region for the particular locale.

6. The system of claim 5, wherein the plurality of previously classified areas is classified based on a zip code, congressional district, neighborhood, city, or county.

7. The system of claim 1, wherein the operations further comprise generating the index, the generating the index comprising indexing each point of interest (POI) or address in the data storage with a region identifier that corresponds to a region for a particular locale that the POI or address is located within.

8. The system of claim 1, wherein:
the search term comprises a portion of a name of a point of interest (POI) or a portion of an address; and
the causing presentation of the result comprises presenting the result as suggestions for completing the name of the POI or the address.

9. The system of claim 1, wherein:
the search term comprises a selection of a category; and
the causing presentation of the result comprises presenting the result as suggestions for a point of interest (POI).

10. A method comprising:
receiving an indication of a search being performed at a user device;
detecting a location of the user device;
accessing an index in a data storage;
determining, from the index, a region identifier that corresponds to the location of the user device, the region identifier identifying a dynamically generated region in which to perform the search;
based on a search term, performing, by one or more hardware processors, the search in the dynamically generated region corresponding to the region identifier; and
causing presentation of a result of the search on the user device.

11. The method of claim 10, further comprising generating the dynamically generated region, the generating comprising:
accessing trip data;
for a particular locale, generating a plurality of location clusters, each location cluster representing an area to which a threshold number of users traveled from the particular locale; and
grouping the plurality of location clusters to form the dynamically generated region for the particular locale.

12. The method of claim 11, wherein the generating the cluster comprises using the K-means clustering algorithm.

13. The method of claim 11, wherein the generating the cluster comprise using the density-based spatial clustering of applications with noise (DBSCAN) algorithm.

14. The method of claim 10, further comprising generating the dynamically generated region, the generating comprising:
accessing trip data;
for a particular locale, determining a number of trips from the particular locale to each of a plurality of previously classified areas;
ranking the plurality of previously classified areas based on the number of trips from the particular locale;
selecting a top number of previously classified areas based on the ranking; and
grouping the top number of previously classified areas to form the dynamically generated region for the particular locale.

15. The method of claim 14, wherein the plurality of previously classified areas is classified based on a zip code, congressional district, neighborhood, city, or county.

16. The method of claim 10, further comprising generating the index, the generating the index comprising indexing each point of interest (POI) or address in the data storage with a region identifier that corresponds to a region for a particular locale that the POI or address is located within.

17. The method of claim 10, wherein:
the search term comprises a portion of a name of a point of interest (POI) or a portion of an address; and
the causing presentation of the result comprises presenting the result as suggestions for completing the name of the POI or the address.

18. The method of claim 10, wherein:
the search term comprises a selection of a category; and
the causing presentation of the result comprises presenting the result as suggestions for a point of interest (POI).

19. A non-transitory machine-storage medium storing instructions that, when executed by one or more processors of a machine, cause the one or more processors to perform operations comprising: receiving an indication of a search being performed at a user device; detecting a location of the user device; accessing an index in a data storage; determining, from the index, a region identifier that corresponds to the location of the user device, the region identifier identifying a dynamically generated region in which to perform the search; based on a search term, performing the search in the dynamically generated region corresponding to the region identifier; and causing presentation of a result of the search on the user device.

20. A non-transitory machine-storage medium of claim 19, wherein the operations further comprise: generating the dynamically generated region; and generating the index, the generating the index comprising indexing each point of interest (POI) or address in the data storage with a region identifier that corresponds to a region for a particular locale that the POI or address is located within.

\* \* \* \* \*

UNITED STATES PATENT AND TRADEMARK OFFICE
CERTIFICATE OF CORRECTION

PATENT NO. : 10,187,747 B1  
APPLICATION NO. : 16/018735  
DATED : January 22, 2019  
INVENTOR(S) : Zhang et al.

Page 1 of 1

It is certified that error appears in the above-identified patent and that said Letters Patent is hereby corrected as shown below:

In the Claims

In Column 21, Line 15, in Claim 19, after "comprising:", insert --¶--

In Column 21, Line 16, in Claim 19, after "device;", insert --¶--

In Column 21, Line 17, in Claim 19, after "device;", insert --¶--

In Column 21, Line 17, in Claim 19, after "storage;", insert --¶--

In Column 21, Line 21, in Claim 19, after "search;", insert --¶--

In Column 21, Line 23, in Claim 19, after "and", insert --¶--

In Column 21, Line 26, in Claim 20, after "comprise:", insert --¶--

In Column 21, Line 27, in Claim 20, after "and", insert --¶--

Signed and Sealed this  
Fourteenth Day of April, 2020

Andrei Iancu  
*Director of the United States Patent and Trademark Office*